United States Patent [19]

Beyer et al.

[11] Patent Number: 4,645,796
[45] Date of Patent: Feb. 24, 1987

[54] POLYBLENDS OF STYRENE/α-METHYLSTYRENE COPOLYMERS WITH REINFORCING INTERPOLYMERIZED STYRENE-GRAFTED RUBBER CONCENTRATES

[75] Inventors: Douglas E. Beyer; Edward T. Carrington, both of Midland, Mich.

[73] Assignee: The Dow Chemical Company, Midland, Mich.

[21] Appl. No.: 840,485

[22] Filed: Mar. 14, 1986

Related U.S. Application Data

[63] Continuation of Ser. No. 712,286, Mar. 15, 1985, abandoned, which is a continuation-in-part of Ser. No. 618,178, Jun. 7, 1984, abandoned.

[51] Int. Cl.$^4$ .................... C08L 45/00; C08L 51/04; C08L 55/02
[52] U.S. Cl. ....................................... 525/84; 525/75; 525/85; 525/86; 525/902
[58] Field of Search ................... 525/84, 85, 86, 902, 525/75

[56] References Cited

U.S. PATENT DOCUMENTS 4,200,702  4/1980  Gauesepohl et al. ............... 525/86
4,277,574  7/1981  Jastrzebski et al. ................ 525/86

*Primary Examiner*—Jacob Ziegler

[57] ABSTRACT

Novel and particularly utile for many specific and extraordinarily-demanding applications intimately-blended admixtures of diverse synthetic resinous copolymers and graft-structured and/or the like or equivalent elastomer-based polymerizates are comprised of thoroughly intermixed products of polymerization (i.e., "polyblends") of: (i) copolymer(s) of styrene/α-methylstyrene and equivalents thereof with (ii) grafted rubber concentrates of an elastomeric substrate or backbone having thereon and thereto graft-interpolymerized styrene components therein and/or like or equivalent grafted rubber concentrate component(s). The polyblends involved exhibit superior and much-improved properties and characteristics of thermal stability, environmental stress crack resistance, hardness and so forth.

20 Claims, No Drawings

POLYBLENDS OF STYRENE/α-METHYLSTYRENE COPOLYMERS WITH REINFORCING INTERPOLYMERIZED STYRENE-GRAFTED RUBBER CONCENTRATES

This is a continuation of application Ser. No. 712,286, filed Mar. 15, 1985 now abandoned, which is continuation-in-part of copending, application Ser. No. 618,178, filed June 7, 1984, now abandoned.

BACKGROUND OF THE INVENTION

1. Field of the Invention

This invention pertains to improved polyblends as readily fabricatable synthetic plastic products which are such an admixed product of a copolymer of styrene and α-methylstyrene with a grafted interpolymerizate of polystyrene on an elastomeric polybutadiene substrate or backbone.

2. Description of the Prior Art

The preparations of various homo- and copolymers of α-methylstyrene including styrene/α-methylstyrene copolymers and many sorts of α-methylstyrene-containing graft, block and the like interpolymers on elastomeric or rubber substrates and/or with a number of other monomeric materials co- or otherwise interpolymerized with α-methylstyrene are well known and are exemplified in such references as U.S. Pat. Nos. 2,658,058, 3,036,053, 3,069,405, 3,367,995, 3,463,833, 3,825,623, 3,952,512, 3,956,426, 4,075,253, 4,097,557, 4,104,327, and 4,294,946 plus British Pat. No. 1,264,741 the teachings of which are incorporated by reference thereto.

The theory and practice of polymer compatibility and blending is set forth by D. R. Paul and Seymour Newman in *Polymer Blends*, Vols. 1 and 2, Academic Press (a Subsidiary of Harcourt Brace Jovanovich) Publishers of New York, San Francisco and London (1978), the context of which is incorporated by reference.

A number of plastics products, including polyblends, have been provided and are more or less well known, some of these including interpolymers of α-methylstyrene. Typical of these are: (a) the rubber-modified high impact styrene polymers in some of which mechanical blends of an elastomer with a polystyrene or other styrene copolymer are involved but in most the product is an at least partial interpolymer of styrene or mixtures of styrene and other monomeric materials copolymerizable therewith onto and with a polybutadiene or equivalent rubber or in combination with one or more synthetic, rubbery elastomers, (b) equivalents of the foregoing which are analogous but most frequently of a polyblend nature, including those in which the elastomeric component is an interpolymer of styrene, or in admixture with other monomer(s) copolymerizable with styrene made in graft-, block- or like or equivalent-interpolymer form with which a homo-or copolymer of styrene and/or other ethylenically-unsaturated monomeric materials that are copolymerizable by the free radical addition mode with styrene and like monomers is physically admixed for the resultant elastomer-modified product; and (c) the so-called ABS or ABS-type materials "ABS" being an acronym for interpolymers of acrylonitrile, butadiene and styrene) which have been available and used for many years and are characterized, in *ABS Plastics* by Costas H. Baskekis published in 1964 as part of its *Plastics Application Series* by Rheinhold Publishing Corporation of New York City, another being set forth in *Toughened Plastics* by C. B. Bucknell, Applied Science Publishers Ltd., London (1977); said publications being also herein incorporated by reference thereto.

Many of the polyblend products described in the foregoing in the item (b) materials are interblended products of styrene (and/or other monomeric materials which are copolymerizable with styrene) homo- and/or copolymer(s) that are not interpolymers with rubbers and/or elastomeric preformed polymers with the rubber- or other elastomer-modified grafted or the like (such as "block") interpolymers—and not merely mechanically blended—components identified amongst the item (a) products. A comprehensive capsulated description of the various types of graft- and/or block-copolymer varieties of interpolymerized elastomers is set forth in the disclosure of chemically-formulated or molecular architectural Structures (S-I) through (S-VI), inclusive, to be found in U.S. Pat. No. 4,371,663 (Russell), herewith incorporated by reference. There is a delineation of suitable natural and synthetic rubbers or elastomers useful for preparation of the here-contemplated graft-and/or block-type copolymer or interpolymer "backbones" or substrates as well as the actual grafted interpolymerized materials for utilization in the provision of the presently-involved polyblended products with styrene/ α-methylstyrene copolymers and their equivalents employed in practice of the present invention.

Many of the of synthetic resinous thermoplastic polymerizates and/or polyblends have acceptable tensile strengths, impact resistances and heat distortion values. However, they are often found to have less than desirable degrees of other significant properties such as and including thermal stability, hardness and environmental stress crack resistance; this being prevalent when the plastics are prepared from conventionally interpolymerizates of styrene, including the polyblends of various styrene polymers with differing rubber-modifiers.

It would be advantageous if a polyblend of a rubber-modifying styrene or the like graft copolymer components in intimate admixture with an α-methylstyrene or isopropenyl aromatic monomer were available which exhibited not only satisfactory properties of tensile strength, impact resistance and high heat distortion values but at the same time also displayed characteristics of superior thermal stability, outstanding hardness and environmental stress crack resistance to a superior degree.

These outstanding benefits and other advantages in accordance with the present invention can be understood from a consideration of the following specification and illustrations.

DESCRIPTION OF THE INVENTION

The present invention, pertains to and surprisingly advantageous polyblended components of:

(A) Between about 40 and about 95 percent by weight, based on total weight of the involved polyblend, of a copolymer product of copolymerization having copolymerized therein, based on total weight percent of the copolymer, from about 10 to about 70 mole percent of at least one isopropenyl aromatic monomer of Formula (I) with from about 90 to about 30 mole percent of at least one vinyl aromatic monomer of Formula (II); and (B) between about 5 and about 60 percent by weight of a grafted rubber concentrate material of the so-called "shell/core" type of graft copolymer structure that contains graft-interpolymerized therein between about 10 and about 75 weight percent of at least one alkenyl aromatic monomer of Formula (III) in the shell portion of its structure that is graft-copolymerized to and upon between about 90 and about 25 weight percent of interpolymerizable natural or synthetic rubber or mixtures thereof as the backbone substrate or core portion of said grafted rubber concentrate structure. In the preparation of the grafted rubber concentrate about half the Formula III polymerized monomer forms graft and about an equal amount of homopolymer is formed.

Advantageously, the polyblends in accordance with the present invention contain between about 60 and about 90 percent by weight of Component (A) with a proportion of same in the polyblend that is about 60 or so weight percent providing for a preferred product.

The isopropenyl aromatic monomers utilizable in the preparation of the copolymer Component (A) in the polyblends of the invention are of the Formula:

wherein Ar is an aromatic radical (including various alkyl and halo-ring-substituted aromatic units) of from 6 to about 10 carbon atoms. The preferable monomer of the Formula (I) is α-methylstyrene although such specific varieties as isopropenyltoluene and isopropenylnaphthalene may also be utilized with advantage. Formula (I) monomers in mixtures may be employed.

Styrene is generally preferred as the vinyl aromatic monomer employed for copolymerization with the Formula (I) monomers for preparation of the Component (A) constitutent. Other monomeric materials equivalent to styrene which may be utilized in place of styrene or in various mixtures with one another which may also include styrene are of the Formula II:

wherein Ar is an aromatic radical of the same definition as employed in the description of Formula (I). Species of Formula (II) monomers besides styrene that may, be employed include: vinyltoluene; vinylnaphthalene, the dimethylstyrenes; t-butylstyrene; the several chlorostyrenes (such as the mono- and dichloro-variants); the several bromostyrenes (such as the mono-and dibromo-variants); and the like.

It is often advantageous for the Formula (I)/Formula (II) copolymers employed as the Component (A) constituents in the polyblends of the present invention to contain between about 20 and 70 weight percent of copolymerized Formula (I) monomer. It is frequently preferred for this proportion of the copolymerized Formula (I) monomer to be in the neighborhood of 50 to 70 weight percent. The heat distortion characteristics are substantially improved as the proportion of the Formula (I) monomer in the copolymers used as the Component (A) constituents is increased; particularly when α-methylstyrene is the included comonomer and especially so when such copolymer is comprised substantially of copolymerized α-methylstyrene and styrene.

The Formula (I)/Formula (II) copolymers perform well when their weight average molecular weight ($M_w$) is in the range of from about 50,000 to about 500,000, with associated $M_w$ distribution values of from about 1 to 3 or so. There is usually achieved a most beneficial effect when the Component (A) copolymers have $M_w$ values in the range between 100,000 and 200,000 with the $M_w$ distribution values lying between the 1 to 2½.

The "shell/core" type graft-interpolymerized rubber concentrates employed as the Component (B) constituents of the polyblended compositions of the invention preferably have a core portion of normally-solid, elastomeric polybutadiene. Any elastomeric material that can be obtained in emulsion or latex form is suitable for use in the present invention. Such elastomeric material may be prepared by free radical polymerization in an emulsion or alternatively an elastomer is dissolved in a solvent, the solution mechanically emulsified, agglomerated and grafted as described by component (B). Some such elastomers include butadiene polymers, isoprene polymers, acrylate polymers, ethylene propylene copolymers with a diene. Such elastomers include copolymers and terpolymers employing materials such as styrene, acrylonitrile and the like. Other of the rubbers and elastomers are disclosed in U.S. Pat. No. 4,371,663. This is especially the case when the synthetic rubber involved is a polymer or copolymer (besides polybutadiene) of butadiene-1,3 and/or isoprene and/or 2,3-dimethylbutadiene-1,3 and the like.

The shell portion of the grafted rubber concentrates included in the Component (B) constitutents of the polyblends of the present invention is preferably interpolymerized polystyrene grafted upon and with the substrate backbone elastomeric core. It is often times of greater advantage for the interpolymerized shell portion of the grafted rubber concentrate to be between about 20 and about 30 weight percent of the graft-interpolymerized component; with optimum benefit often being when the graft-interpolymerized shell portion is about 25 weight percent of the grafted rubber concentrate material (which is to more specifically say within ±3 weight percent of that 0.5:1 weight ratio figure).

Equivalents of polystyrene interpolymers for the shell portion of the grafted rubber concentrate include polymerized moieties of monomers which may include mixtures thereof with or without styrene, in any plural combination of such monomers which are of the styrene-including Formula:

wherein G is selected from the group consisting of hydrogen and methyl and Ar has the same discription as therefor provided in the Formulae (I) and (II). Other than styrene, monomers of the Formula (III) which may be employed include those specifically identified in connection with said Formulae (I) and (II). Unless specilized graft-interpolymerization techniques are utilized, it is ordinarily prudent to employ none or only minor proportions of isopropenyl aromatic monomers for the Formula (III) monomer to be grafted as a shell portion onto and about the substrate elastomeric core. When a latex of a polymer of 10 weight percent acrylic acid and 90 weight percent ethyl acrylate is utilized as an agglomerating agent, generally not more than 0.4 parts by weight based on solids of the material is utilized per 100 parts of the elastomer to be agglomerated. A shell/core agglomerating agent has been found to be of better properties than the acrylic acid acrylate combination. The shell/core agglomerating agent contains about 8 weight percent methacrylic acid and 92 percent ethyl acrylate and about 2 parts of the agent are used for 100 parts of the elastomer to be agglomerated. In both cases, about 30 to 50 weight percent of the original elastomer having a particle diameter of about 0.1 micron is agglomerated to a size of about 0.3 to about 2.5 microns.

In considering suitable particle sizes of the grafted rubber concentrate materials used for the Component (B) in polyblends of the present invention, it is usually desirable for the individual particles (whether monodisperse or polydisperse, either of which is satisfactory) to be relatively large such as in the range of from about 0.05 to about 3 or so microns ($\mu$); more frequently to be not smaller than about $0.3\mu$ and not larger than about $2\mu$.

Isopropenyl aromatic monomers of the Formula (I), particularly $\alpha$-methylstyrene, are difficult and sometimes impossible to polymerize by thermal or free-radical-catalyst-initiated polymerization whether done in mass or by solution or suspension polymerization. Such difficulty is also experienced when conventional polymerizing techniques are used to make random copolymers and/or graft copolymers of isopropenyl aromatic monomers with other mono- or ethylenically-unsaturated monomers and polymers which normally are readily polymerizable by thermal or free-radical mechanisms.

The indicated copolymers and graft copolymers utilizing $\alpha$-methylstyrene and/or other Formula (I) monomers are readily made by anionic, solution polymerization using an organometallic initiator, such as sec-butyl-lithium, n-butyl-lithium and the like as in U.S. Pat. Nos. 3,322,734 and 3,404,134, and the like. A good procedure for co- and interpolymerization of isopropenyl aromatic monomers is as disclosed in the copending application G. Y-S. Lo having Ser. No. 630,906 which was filed Jul. 13, 1984, now abandoned, a continuation-in-part of Ser. No. 525,336 filed Aug. 22, 1983, now abandoned, and is assigned to the same common Assignee as is the present application.

To make the polyblends of the present invention, the desired proportions or Components (A) and (B) are, physically admixed to provide a mixture which appears homogeneous to the unaided eye. Any suitable plastics compounding apparatus may be employed. Batchwise blendings may be done using such equipment as a Brabender "PLASTICORDER" (Reg. TM); while continuous blending may be made with ordinary extruders, including twin-screw extruders. In many instances, the polyblends are prepared by melt blending of the Components (A) and (B) by mechanical admixture thereof on or in intensive compounding equipment (such as, extruders; compounding rolls Banbury mixers, and the like) at a temperature adequate to heat plastify the components being mixed but lower than that which might cause significant polymer decomposition thereof. If the polymers are in latex form, the latexes can be blended, the blend coagulated and dried to recover the polymer.

The polyblended products of the present invention can, contain other additives that are oftentimes utilized in plastics compositions, such as, by way of illustration but without limitation thereto: antioxidants; pigments; dyes; fillers; stabilizers; mineral oil and other plasticizers and lubricants; blowing agents; and the like.

The polyblends of the present invention have a combination of very good toughness with high heat distortion values. Those skilled in the art might predict that such a polyblend as one of an $\alpha$-methylstyrene/styrene copolymer with a grafted rubber concentrate of a "shell/core" type graft-copolymer of styrene on polybutadiene, might: (i) if of good compatability, have adequate toughness but poor heat distortion or (ii) if of poor compatability, poor toughness while perhaps maintaining heat distortion. However, as shown in Table I, a typical polyblend pursuant to the present invention surprisingly exhibits good heat distortion while still maintaining high tensile strength and acceptable impact resistance.

TABLE I

Physical Property Comparisons of Some Styrenic Plastics

| Product Tested | Tensile Yield Strength $(T_y)$, psi | Izod Impact Strength in ft-lb/in. of Notch | Vicat Heat Distortion Value in °F. | Gloss |
|---|---|---|---|---|
| (a) HIPS[1] | 3,000 | 2.2 | 202 | 20 |
| (b) ABS[2] | 5,900 | 6.0 | 222 | 38 |
| (c) GRC/PS[3] | 4,500 | 5.2 | 212 | 90 |
| (d) GRC/SAN[4] | 5,800 | 5.0 | 219 | 92 |
| (e) GRC/S-$\alpha$MS[5] | 4,500 | 3.8 | 259 | 90 |

[1] A typical rubber-modified high-impact polystyrene plastic composition made with styrene monomer on about 5 weight percent of polybutadiene.
[2] A typical ABS product of polymerized acrylonitrile/butadiene/styrene having a rubber content of about 13.5 weight percent with a soluble fraction containing about 23.5 weight percent acrylonitrile, the product having properties about equivalent to such commercially available ABS resins.
[3] A polyblend of about 50 percent by weight of general purpose polystyrene with a grafted rubber concentrate of the "shell/core" type having about 49 weight percent of polymerized styrene shell upon and with its polybutadiene core with a polydisperse particle size distribution and an average size of particles of about $1.3\mu$, this being the same grafted rubber concentrate material as prepared in accordance with the Third Illustration in the following Examples of the Invention.
[4] A polyblend of about 50 percent by weight of a styrene/acrylonitrile copolymer containing about 29.7 weight percent of acrylonitrile copolymerized therein admixed with a grafted rubber concentrate which contains about 50 weight percent polybutadiene and having styrene-acrylonitrile copolymer grafted thereon and a particle size range of about 0.1 to 1 micron.
[5] A polyblend of about 50 percent by weight of an $\alpha$-methylstyrene/styrene copolymer containing about 50 weight percent of each of the comonomers copolymerized therein admixed with the same grafted rubber concentrate material employed for Product (c).

The polyblends of the present invention are useful for heat fabrication (by injection and compression molding, extrusion, thermoforming and the like) into articles that are both tough and withstand higher service temperatures. Such applications, include hot-fill containers, dishes, cups, reusable containers for microwave heating and/or cooking; electronic component parts; television cabinets; automotive parts and like uses usages where high temperature performance is desirable. Shaped articles produced from polyblends in accordance with the present invention can be made to have an attractive smooth and glossy surface which cleans readily when subjected to ordinary washing procedures. They are also readily paintable and weldable.

EXAMPLES OF THE INVENTION

The following examples show the benefits of reduction to practice of the present invention. All parts and percentages are given on a weight basis and all temperature readings (unless otherwise specified) are in degrees Centigrade, °C.

EXAMPLE 1

The general teaching of U.S. Pat. No. 4,419,496 (Henton and O'Brien) herewith incorporated by reference thereto was employed.

A grafted rubber concentrate of the "shell/core" type of graft copolymer of a polystyrene shell portion on a polybutadiene core was prepared in the following manner. Minor proportions of monomeric materials other than styrene and butadiene were employed. These materials were used for the preparation of an agglomerating agent used to produce relatively large-sized and largely monodispersed particles of the polybutadiene core backbone. In adaptation of the Henton and O'Brien technique for preparation of grafted rubber concentrate materials, the steps involved include: (i) preparation of a polybutadiene latex rubber; (ii) rubber agglomeration; and (iii) grafting of the rubber. The agglomerating agent is separately prepared for use in Step (ii).

The preparation of the agglomerating agent was done in a 200 U.S. gallon glass-lined jacketed Pfaudler kettle equipped with an agitator. The following mixtures were prepared (with all numerical weight quantities indicated in pounds avoirdupois):

1. Reactor Charge:

807—deionized water
1.8—sodium bicarbonate
1.08—sodium persulfate
2.25—"CALSOFT L-40" (Reg. TM) of 40% activity grade
1.32—acrylic acid

2. Monomer Mix:

540—ethyl acrylate
60—acrylic acid

3. Aqueous Mix:

270—deionized water
28.4—"CALSOFT L-40", a dispersing detergent ingredient

The reactor charge (1) was added to the Pfaudler reactor at 30° C. The reactor contents were deoxygenated using nitrogen and vacuum. After oxygen was removed, 13.5 pounds of Mixture (2) was added to the reactor and the contents were heated to 65° C. Fifteen (15) minutes after the reactor contents had reached 65° C., a concurrent-addition or "con-add" of Monomer Mix (2) was begun and continued for five hours at a rate of 117.3 pounds per hour. Ten (10) minutes after commencement of the Monomer Mix (2) addition, the Aqueous Mix (3) was fed to the reactor for 5 hours at a rate of 59.7 pounds per hour. When all the additions were completed, the reaction mixture was maintained for an additional 3 hours at 65° C. After cooling, the resulting agglomerating agent mixture was filtered for subsequent use.

In order to prepare the grafted rubber concentrate material for preparation of polyblends in accordance with the present invention, a second set of preformulated mixtures was prepared most being in the form of aqueous solutions where the below-indicated percent activity or percent solids concentrations were used. Manufacture of the grafted rubber concentrate material was done in a 3,500 U.S. gallon glass lined jacketed reactor. The mixtures used were as follows where quantities are pound avoirdupois:

4. Reactor Charge for Graft Copolymer Formation:

5,480—deionized water
152—34.5 percent active polybutadiene seed latex
1,663—0.467 percent active sodium bicarbonate
130—1.13 percent solids "VERSENE" (Reg. TM) chelating agent (tetrasodium ethylenedinitriol tetra acetate)

5. Rubber Reaction Aqueous Mix:

954—deionized water
314—43.9 percent solids "CALSOFT L-40" (a sodium alkylarylsulphonate)

6. Agglomerating Agent Mix:

3,720—deionized water
50—42.9 percent solids "CALSOFT L-40"
208—agglomerating agent from the above-described pre-preparation

7. Aqueous Mix for Graft Reaction Accomplishment:

3,260—deionized water
50—42.9 percent solids "CALSOFT L-40"
829—2.46 percent active sodium persulfate catalyst Reactor Charge (4) was added to the reactor and deoxygenated by vacuum after which the reactor was heated to 65° C. During the heat-up period, 73 pounds of acrylonitrile was added to the reaction mass in the reactor. After the reactor contents had reached 65° C. there were then charged: 4 pounds acrylonitrile; 9 pounds styrene; 174 pounds butadiene-1,3; 0.7 pounds n-dodecylmercaptan; and 304.3 pounds of an aqueous solution of 2.46 percent active sodium persulfate. After that charging, the following additives were then begun:

| Material | Addition Rate (lbs/hr) | Addition Duration (hrs) | Total Additions (lbs) |
|---|---|---|---|
| Styrene | 24.9 | 8 | 235 |
| Acrylonitrile | 12.6 | 8 | 101 |
| Butadiene | 557.5 | 8 | 4,460 |
| n-Dodecylmercaptan | 2.32 | 7.75 | 18 |
| Aqueous Mix (5) | 2.06 | 6 | 1,238 |

Upon completion of all of the above-indicated conadds, the temperature of the reaction mass was held at 65° C. until a 20 psig pressure was reached in the reactor. The reactor was then vented and purged with about 3,600 ft³ of nitrogen.

After purging, 1950 grams of this latex was placed in a 4-liter cylindrical reactor. The reactor and contents were heated to 80° C. The contents were agitated with a paddle agitator on a shaft rotating at about 300 revolutions per minute. 130 Grams of agglomerating mix (6) were added to the reactor at a rate of 4.83 grams per minute. On completion of the addition of the agglomerating mix, the reactor temperature was reduced to 70° C. and the following graft copolymerization reaction additions were added to the reactor.

| Material | Addition Rate (gm/hr) | Addition Duration (hrs) | Total Additions (gm) |
|---|---|---|---|
| Aqueous Mix (7) | 85.1 | 7 | 595.8 |
| Styrene Monomer | 100.3 | 7 | 702 |

| Material | Addition Rate (gm/hr) | Addition Duration (hrs) | Total Additions (gm) |
|---|---|---|---|
| n-Dodecylmercaptan | 0.155 | 6.75 | 10 |

The graft copolymerization reaction was allowed to proceed for an hour after completion of all above-indicated additions. The reactor contents were then cooled.

The resulting grafted rubber concentrate converted from latex to a dry powder. A plurality of dried samples were prepared by a charging one (1) U.S. gallon of the grafted rubber concentrate latex into a steam-stripping unit, adding to the latex prior to the stripping about 3-5 grams of a commercial silicone antifoam agent obtained from Dow Corning Corporation of Midland, Michigan 48640, under the trade-designation "DOW CORNING FG-10". For each gallon portion converted, the steam stripping was continued until 350 ml of condensate had been collected. After that, 0.6 percent (based on the rubber content) of "TOPANOL CA" (Reg. TM; TOPANOL CA is 1,1,3-tris(2' methyl 4' hydroxy-5' tertiary-butyl phenyl) butane), and 0.2 percent (also based on the involved rubber content) of dilaurylthiodipropanoate were added to each steam-stripped sample. The product was then freeze-coagulated, centrifuged and dried overnight at 50°.

The resultant pulverulant grafted rubber concentrate material was used in the preparation of polyblends according to the present invention.

EXAMPLE II

The general procedure of Example I was used to prepare a second grafted rubber concentrate.

The following mixes were employed:

Mix 1. 35 parts of polybutadiene latex rubber combined with 65 parts of deionized water;

Mix 2. An agglomerating agent mix of 1.8 parts of Mix 6 of example 1 plus 0.6 parts of "CALSOFT L-40" and 97.6 parts of deionized water;

Mix 3. An aqueous mix of 0.4 parts sodium persulfate with 2.2 parts of "CALSOFT L-40" and 97.4 parts of deionized water; and Mix 4. A monomer mix of 0.15 parts of n-octyl mercaptan and 99.85 parts of monomeric styrene.

A ten (10) U.S. gallon-sized stirred jacketed reactor was employed. The reactor was charged with 16,150 grams of Mix 1 which was first deoxygenated and then heated to 70° C. Following that, 1,100 grams of Mix 2 was added into the reactor at a uniform rate over a 28 minute period. Then, 5,040 grams of Mix 3 and 5,880 grams of Mix 4 were charged, to the reactor over a 7 hour period at a temperature of 70° C.; the reaction mixture was maintained at 70° C. for one hour after addition was complete. Prior to steam-stripping of the completed product, 21 grams of "TOPANOL CA" and 7 grams of dilaurylthiodipropanoate were added to the resultant latex. The grafted rubber concentrate was then, as in Example 1 freeze-coagulated, centrifuged and dried.

The grafted rubber concentrate material was employed in the manufacture of polyblend products pursuant to the invention.

EXAMPLE 3

A 50:50 weight ratio copolymer of α-methylstyrene and styrene was made by means of continuous anionic polymerization so as to have a 170,000 $M_w$.

The procedure of Example 2 was used to prepare a grafted rubber concentrate material which had a 51 percent butadiene content with polydisperse particle size distribution having an average particle size of 0.6μ.

Blending of 608 grams of the described copolymer and 329 grams of the described grafted rubber concentrate was then accomplished by passing a mixture thereof through an 0.8 inch Welding Engineer Twin Screw Extruder. The polyblended product was then injection molded into test bars with which the physical properties were then determined.

The results obtained, are set forth in the following Table II.

TABLE II
Physical Properties of Typical Polyblend Made According to the Invention

| Property Tested | Result |
|---|---|
| Tensile Yield ($T_y$) in psi | 4,500 |
| Tensile Rupture ($T_r$) in psi | 3,800 |
| % Elongation (at break) | 27 |
| Tensile Modulus in psi × $10^{-5}$ | 3.2 |
| Izod Impact Value in ft-lb/in of Notch | 3.8 |
| Vicat Heat Distortion Temperature in °F. | 258 |
| Melt Flow Rate at Condition "I" in gms/10 minutes | 1.5 |

EXAMPLE 4

Repeating the general procedure as set forth in Example 3, two (2) additional α-methylstyrene/styrene copolymers were prepared; one of which had a $M_w$ of 110,000 with a 1.5 value distribution thereof and the other of which had a $M_w$ of 170,00 with 2.2 distribution.

Both copolymers showed excellent results, commensurate with those in Table II, when blended with various grafted rubber concentrate materials containing about 50 percent polymerized polystyrene in the shell portions thereof (being similar to the grafted rubber concentrate of Example 3), so that equal weight proportions of the copolymers and the grafted rubber concentrates were present in the several samples which were tested, each of which was made into polyblends in accordance with the twin extruder of Example 3.

It is generally desirable to maximize the styrene polymer content of the shell of the to grafted rubber concentrate to maximize the percent Elongation at Break values in the polyblend products of the invention.

EXAMPLE 5

To demonstrate the effect of particle size control in the grafted rubber concentrates employed in the practice of the present invention, the procedure of the Example 3 was repeated excepting to utilize grafted rubber concentrate whose particle size did not exceed 1.8μ (in contrast with the grafted rubber concentrate of the Example 3 which had an average particle size value of 0.90μ but contained some particles varying in size over the 1.8-6μ range).

Samples of polyblends with these 1.8μ or less particle size grafted rubber concentrates were then prepared in about the same homopolymer or copolymer to grafted rubber concentrate weight ratios as made in the Example 3 using in some, for comparative purposes, general purpose polystyrene in the mixtures and in the others α-methylstyrene/styrene copolymers as generally as in Example 3. The test specimens of both the first and second grafted rubber concentrate materials with no particle size inclusions greater than 1.8μ were compared with control samples of analogous homopolystyrene and α-methylstyrene/styrene copolymer polyblends containing the grafted rubber concentrate material as used in the Example 3 which had, along with the 0.9μ or less particles the 1.8–6μ particles.

The results as are set forth in Table III, in which the Control Polyblend Samples were composed as above-indicated and the Blend Polyblend Samples made with the 1.8μ or less particle size-containing grafted rubber concentrate variations are identified as "GRC-1" and "GRC-2", respectively. The polyblends were formulated to contain 20 weight percent elastomer.

TABLE III

|  | GRC 1 | GRC 2 | % Properties RPS Effect |
|---|---|---|---|
| Agglomerating Agent | A | shell/core |  |
| Agglomerated Rubber Particle Size in Microns | 0.83 (0.3–2.2) | 0.6 (0.3–1.12) |  |
| Unagglomerated Rubber Particle Size in Microns | 0.1 | 0.1 |  |
| Weight Percent Agglomeration | 41.6 | 39.5 |  |
| Graft Weight/Rubber Weight General Purpose Polystyrene (285,000 $M_w$) | 0.5 | 0.46 |  |
| Tensile Yield (psi) | 4,320 | 4,660 | +8 |
| Izod (ft-lb/inch of notch) Impact Value | 4.0 | 1.5 | −63 |
| Gardner Dart (inch-lb) | 320 | 25 | −92 |
| Vicat (°F.) Softening Point | 220 | 222 | +1 |
| 50/50 Copolymer |  |  |  |
| Tensile Yield | 4,620 | 4,940 | +7 |
| Izod (ft-lb/inch of notch) Impact Value | 2.8 | 3.6 | +29 |
| Gardner Dart (inch/lb) | 90 | 150 | +67 |
| Vicat (°F.) Softening Point | 260 | 260 | 0 |

The use of the graft rubber concentrate 2 in place of graft rubber concentrate 1, essentially substituting the smaller rubber particles causes a loss of impact resistance and blends with general purpose polystyrene while similar changes in styrene alphamethylstyrene blends result in substantial gain in impact resistance.

The polyblends made from the controlled particle size grafted rubber concentrates that were prepared with homopolystyrene base resin in the admixture had substantially lessened and markedly poor toughness as compared to those made in accordance with practice of the present invention utilizing the α-methylstyrene/styrene copolymer.

EXAMPLE 6

Identical cups were fabricated from a conventional polybutadiene-rubber-modified high-impact polystyrene (equivalent to that described as Test Product (a) in the foregoing Table I) and from a polyblend in accordance with the present invention analogous to that described in the Example 3 above. Both were subjected to immersion in boiling water for fifteen (15) minutes. The high-impact polystyrene cup failed the heat treatment test completely, becoming badly distorted. The polyblend cup was completely unaffected and retained its original shape despite the same boiling water test treatment.

Also of great practical importance for synthetic resinous materials is their resistance to food oils. A test of resins resistant to food oils, samples of the polymers in accordance with the present invention, were placed under a tensile load of about 800 pounds per square inch, while subjected to an environment of simulated food oil using a one-to-one mixture of lactic acid and cottonseed oil. Samples of resins in accordance with the present invention were exposed for a period of 100,000 minutes or more, and did not show signs of failure. When similar samples were prepared utilizing polystyrene rather than α-methylstyrene copolymers, the samples prepared with the general purpose polystyrene failed between about 2,000 and 4,000 minutes.

EXAMPLE 7

While it is known that copolymers of α-methylstyrene and styrene typically have good heat distortion resistance, the polyblends of the present invention have heat distortion characteristics that are higher than those which might be rationally predictable. The grafted rubber concentrate materials would tend to reduce heat distortion resistance upon polyblending thereof with even an α-methylstyrene/styrene copolymer component.

The heat distortion values of polyblends prepared in accordance with the present invention are either at least equal to and often greater than those predictable from the components of homopolystyrene and/or α-methylstyrene/styrene copolymers when the latter are individually subjected to the same heat distortion testing;

Many changes and modifications can readily be made and adapted in specifically altered embodiments in accordance with the present invention without substantially or materially departing from its apparent and intended spirit and scope, all in pursuance and accordance with same as it is set forth and defined in the hereto-appended claims.

What is claimed is:

1. An impact resistant and heat distortion resistant and tough polyblend composition that is comprised of an admixture of:
   (a) between about 40 and 95 percent by weight, based on total weight of the polyblend, of a copolymeric product of copolymerization consisting of
   (a′) at least one isopropenyl aromatic monomer of the Formula:

wherein Ar is an aromatic radical which includes various alkyl- and halo-ring-substituted aromatic units of from 6 to about 10 carbon atoms; in copolymered form with
   (a″) at least one vinyl aromatic monomer of the Formula:

wherein Ar is an aromatic radical of the same description as that defined in connection with Formula (I) above; said copolymer containing between about 10 and about 70 mole percent based on total copolymer weight of at least one copolymerized monomer of said Formula (I); and
   (b) as Component (b) thereof, between about 5 and about 60 percent by weight of a shell/core graft-copolymer as a grafted rubber concentrate material for said polyblend which graft copolymer is comprised of:

(b') between about 10 and about 75 weight percent in the exterior shell portion of its structure of an interpolymer of at least one monomer of the Formula:

(III)

wherein G is selected from the group consisting of hydrogen and methyl and Ar is an aromatic radical of the same description as that defined in connection with the above Formulae (I) and (II); said shell-providing interpolymer (b') being formed upon, about and with a substrate or backbone core portion of said graft-copolymer of (b'') between about 90 and about 25 weight percent of an elastomeric, graftable natural or synthetic rubber which provides the core in said graft-copolymer grafted rubber concentrate material of said Component (b).

2. A polyblend composition that is in accordance with that of claim 1, wherein the content of said Component (a) therein is between about 60 and about 90 percent by weight.

3. A polyblend composition that is in accordance with that of claim 1, wherein the percent by weight contents therein of both said Components (a) and (b) are about 60 and 40.

4. A polyblend composition that is in accordance with that of claim 1 wherein said copolymer (a) contains between about 20 and about 70 weight percent of copolymerizate (a').

5. A polyblend composition that is in accordance with that of claim 1, wherein said copolymer (a) has about equal weight proportions of both copolymer (a') of said Formula (I) and (a'') of said Formula (II).

6. A polyblend composition that is in accordance with that of claim 1, wherein said graft-copolymer structure (b) contains between about 40 to about 60 weight percent of the interpolymer (b') in the shell portion of its structure and about 20 to 30 weight percent graft.

7. A polyblend composition that is in accordance with that of claim 1, wherein said graft-copolymer structure (b) contains about equal weight proportions of both the interpolymer (b') in the shell portion of its structure and the substrate rubber (b'') in the core portion of its structure.

8. The composition of claim 1 when: the Formula (I) monomer is α-methylsytrene; both said Formulae (II) and (III) monomers are styrene; and said core (b'') graftable elastomeric substrate is an essentially polybutadiene synthetic rubber.

9. The composition of claim 2 when: the Formula (I) monomer is α-methylsytrene; both said Formulae (II) and (III) monomers are styrene; and said core (b'') graftable elastomeric substrate is an essentially polybutadiene synthetic rubber.

10. The composition of claim 3 when: the Formula (I) monomer is α-methylsytrene; both said Formulae (II) and (III) monomers are styrene; and said core (b'') graftable elastomeric substrate is an essentially polybutadiene synthetic rubber.

11. The composition of claim 4 when: the Formula (I) monomer is α-methylsytrene; both said Formulae (II) and (III) monomers are styrene; and said core (b'') graftable elastomeric substrate is an essentially polybutadiene synthetic rubber.

12. The composition of claim 5 when: the Formula (I) monomer is α-methylsytrene; both said Formulae (II) and (III) monomers are styrene; and said core (b'') graftable elastomeric substrate is an essentially polybutadiene synthetic rubber.

13. The composition of claim 6 when: the Formula (I) monomer is α-methylsytrene; both said Formulae (II) and (III) monomers are styrene; and said core (b'') graftable elastomeric substrate is an essentially polybutadiene synthetic rubber.

14. The composition of claim 7 when: the Formula (I) monomer is α-methylsytrene; both said Formulae (II) and (III) monomers are styrene; and said core (b'') graftable elastomeric substrate is an essentially polybutadiene synthetic rubber.

15. The composition of claim 1 when: the copolymer of which said Component (a) has a weight average molecular weight is between about 50,000 and about 500,000 with an associated weight average molecular weight distribution value between about 1 and 3; and said Component (b) grafted rubber concentrate material has an average particle size in the range of from about 0.2 micron to about 6 microns.

16. The composition of claim 1 when: the copolymer of which said Component (a) has a $M_w$ of from about 100,000 to about 200,000 with an associated weight average molecular weight distribution value between about 1 and 2½; and said Component (b) grafted rubber concentrate material has an average particle size in the range of from about 0.3 to about 2 microns.

17. As an article of manufacture, a formed plastics product that is shaped and fabricated from a polyblend composition that is in accordance with the composition of claim 1.

18. As an article of manufacture, a formed plastics product that is shaped and fabricated from a polyblend composition that is in accordance with the composition of claim 10.

19. As an article of manufacture, a formed plastics product that is shaped and fabricated from a polyblend composition that is in accordance with the composition of claim 14.

20. As an article of manufacture, a formed plastics product that is shaped and fabricated from a polyblend composition that is in accordance with the composition of claim 8.

* * * * *